UNITED STATES PATENT OFFICE.

ANDREW ADAMS AND SAMUEL STODOLE PECK, OF HONOLULU, TERRITORY OF HAWAII.

PROCESS OF REGENERATING VEGETABLE CARBONS.

1,326,159. Specification of Letters Patent. Patented Dec. 30, 1919.

No Drawing. Application filed July 16, 1917. Serial No. 180,915.

*To all whom it may concern:*

Be it known that we, ANDREW ADAMS and SAMUEL STODOLE PECK, citizens of the United States, residing at Honolulu, in the county of Honolulu and Territory of Hawaii, have invented certain new and useful Improvements in Processes of Regenerating Vegetable Carbons, of which the following is a specification.

This invention relates to processes of regenerating vegetable carbons; and it comprises a method of regenerating or revivifying used vegetable carbons, such as those now known on the market as "decolorizing carbons", wherein such carbon is subjected to a fermentation treatment and thereafter the moist or fluent mixture is heated with an electrolyte, such electrolyte being advantageously sulfuric acid, and still more advantageously a certain portion of common salt being used in conjunction with the sulfuric acid; all as more fully hereinafter set forth and as claimed.

In the manufacture of sugar and various other materials, it is a common expedient to purify and decolorize the liquors and the various solutions with the aid of some form of carbon. At present, various forms of vegetable carbon are largely employed and are on the market under the name of decolorizing carbon. After a period of use these carbons become so charged with foreign matters which they have removed from the solutions that they lose their activity. In the interest of economy, it is necessary to regenerate them so that they may be re-used. In the treatment of sugar house liquors, such as beet juice, sorghum juice, cane juice, raw sugar solutions, etc., the carbon takes up a wide variety of different materials from the solution. In part, these matters are fermentable and in part, they are of a mineral nature. The fermentable matters can be destroyed by a natural or induced fermentation. The carbon after the fermentation, however, is not suited for immediate re-use, for the reason that it is left in a gummy or colloidal condition and cannot be readily washed to free it of soluble matters.

We have found however that the carbon may be made suitable for re-use after fermentation if a special treatment, intended to obviate this gummy or colloidal character, be employed. If the carbon which has been allowed or caused to ferment be boiled up in water containing almost any electrolyte, the carbon becomes free filtering and may be readily washed. As an electrolyte we may use any of the acids, such as sulfuric acid, hydrochloric acid, nitric acid, acetic acid, etc., or a neutral electrolyte, such as sodium chlorid. It is in general desirable to boil up the fermented mass in the presence of the electrolyte for about an hour. After this treatment, the carbon may be filtered off in any usual apparatus and washed with warm water. It is then adapted for re-use.

While, as stated, almost any electrolyte may be used, we find in practice we obtain better results by using an acid electrolyte. Dilute sulfuric acid we have found to be an advantageous acid for this purpose. In using sulfuric acid we may proceed about as above described. Hydrochloric acid is also a good electrolyte for the present purposes. We have produced very advantageous results by a combined process wherein we use sulfuric acid together with a certain amount of common salt. The action of the sulfuric acid on the salt is to set free hydrochloric acid and the acid so set free in the boiling mixture is very effectual in correcting the colloidal or gummy condition of the mass and in decomposing and removing the unfermentable impurities.

In an advantageous practical embodiment of the present invention, we first ferment used vegetable carbon charged with impurities which it has taken up from the solutions with which it has been used. This fermentation may be in any desired or ordinary way. It may, for example, be what may be termed a "natural fermentation", that is, by allowing the material to stand for a time, whereby spontaneous fermentation takes place; or it may be induced by the addition of suitable ferments. It is a convenient and advantageous expedient to simply incorporate with the mixture a suitable quantity of ferment taken from a previously fermented batch. Fermentation may be conveniently carried on in a water-tight, open, wooden container or tank. Enough water is ordinarily added to bring its level about two inches above the mass of carbon. Fermentation may be from four to six days, the exact length of time being determined by the amount and character of the fermentable materials contained in the carbon. When fermentation has reached a satisfactory stage, we transfer the mixture to a suitable enameled or other acid resistant vessel, dilute it with a volume of water equal to about three times its own volume, and add a suitable quantity of sulfuric acid; say an amount of 50° Baumé sulfuric acid equal to about 5 per cent. of the weight of the contained carbon. We then boil for about an hour. The mass may then be filtered in any usual apparatus and the residual carbon washed with warm water until only a negligible trace of the acid remains in the leachings.

In practice we ordinarily also employ salt in addition to the sulfuric acid. In so doing, we proceed substantially as described, save that after the boiling has continued for about an hour, about enough sodium chlorid is added to react with all the free sulfuric acid present to form sodium sulfate and hydrochloric acid. We then continue the boiling for about another hour. The mixture is then filtered and washed as above described.

We find that carbon thus regenerated will purify sugar house liquors and other saccharine solutions with approximately the same rapidity and efficiency as new carbon. Carbon may thus be regenerated an indefinite number of times.

In the washing operation, we have found that the removal of the acid may be accelerated and the amount of wash water necessary for the washing can be reduced if we wash with a weak saline solution before the washing with warm water.

While we have more particularly described the use of salt and sulfuric acid alone or together, we have found that the colloidal or gummy condition of the vegetable carbon after fermentation may be corrected and the carbon made freely washable, by boiling with solutions containing other electrolytes. There are very many of these electrolytes which may be used for this purpose. After regeneration, the mixture may be filtered and washed with warm water, as previously described.

Treatment of the mass with boiling sulfuric acid and addition of salt usually works better than treatment with sulfuric acid alone. We have found that the hydrochloric acid generated by the action of the boiling sulfuric acid on the salt is, in the nascent state within the mixture, more effectual than is sulfuric acid alone for correcting the colloidal condition resulting from fermentation, and in decomposing and rendering soluble the unfermentable impurities.

We have also found that by continuing the boiling, a great amount of the hydrochloric acid so formed is volatilized, and, depending upon the length of time of boiling, the amount of acid remaining to be removed by washing is reduced to a minimum. We may, however, use hydrochloric acid alone, otherwise made; but we find it better to generate the hydrochloric acid in the mass.

What we claim is:—

1. The process of regenerating vegetable decolorizing carbons used in purifying saccharine solutions which comprises fermenting such carbon, heating the fermented material in the presence of a solution containing an electrolyte to remove gummy matters and washing.

2. The process of regenerating vegetable carbons used in purifying saccharine solutions which comprises fermenting such carbon, heating the fermented material in the presence of sulfuric acid to remove gummy matters and washing.

3. The process of regenerating vegetable decolorizing carbons used in purifying saccharine solutions which comprises fermenting such carbon, heating the fermented material in the presence of sulfuric acid and salt to remove gummy matters and washing.

4. The process of regenerating vegetable decolorizing carbons used in purifying saccharine solutions which comprises fermenting such carbon, heating the fermented material in the presence of a solution containing a salt to remove gummy matters and washing.

5. The process of regenerating vegetable decolorizing carbons used in purifying saccharine solutions which comprises fermenting such carbon, heating the fermented material in the presence of a solution containing a salt and an acid to remove gummy matters and washing.

6. The process of regenerating vegetable decolorizing carbons used in purifying saccharine solutions which comprises fermenting such carbon, heating the fermented material in the presence of a solution comprising an acid to remove gummy matters, removing the solution, washing with a saline solution and then washing with water.

7. In the regeneration of used vegetable decolorizing carbons containing impurities and in a gummy or colloidal condition rendering washing difficult, the process which comprises the step of heating such a carbon with a solution comprising sulfuric acid, adding salt to such solution while continuing the heating, and washing until the material is substantially free of acid.

ANDREW ADAMS.
SAMUEL STODOLE PECK.

Witnesses:
HENRY ERNEST PODMORE,
JAMES FRANCIS MORGAN.